US008293089B1

(12) United States Patent
James et al.

(10) Patent No.: US 8,293,089 B1
(45) Date of Patent: Oct. 23, 2012

(54) PORTABLE DUAL FIELD GRADIENT FORCE MULTICHANNEL FLOW CYTOMETER DEVICE WITH A DUAL WAVELENGTH LOW NOISE DETECTION SCHEME

(75) Inventors: Conrad D. James, Albuquerque, NM (US); Paul C. Galambos, Albuquerque, NM (US); Mark S. Derzon, Albuquerque, NM (US); Darin C. Graf, Albuquerque, NM (US); Kenneth R. Pohl, Albuquerque, NM (US); Chris J. Bourdon, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 443 days.

(21) Appl. No.: 12/610,409

(22) Filed: Nov. 2, 2009

Related U.S. Application Data

(60) Provisional application No. 61/167,235, filed on Apr. 7, 2009.

(51) Int. Cl.
*B01D 57/02* (2006.01)
*B03C 5/02* (2006.01)

(52) U.S. Cl. ........................................ 204/643; 204/660

(58) Field of Classification Search .................. 204/643, 204/660–664
See application file for complete search history.

(56) References Cited

U.S. PATENT DOCUMENTS 7,713,395 B1 * 5/2010 James et al. .................. 204/643
2002/0036141 A1 * 3/2002 Gascoyne et al. ............ 204/547
2006/0204699 A1 * 9/2006 Maltezos et al. ........... 428/36.91

OTHER PUBLICATIONS

C.D. James and M. Derzon, "Binary Electrokinetic Separation of Target DNA from Background DNA Primers", Sandia Report, SAND2005-6230, printed Oct. 2005.*

Rust, J.A. et al., "Tungsten coil atomic emission spectrometry," Spectrochimica Acta Part B, 2006, pp. 225-229, vol. 61.

Arduini, F. et al., "Fast, sensitive and cost-effective detection of nerve agents in the gas phase using a portable instrument and an electrochemical biosensor," Analytical Bioanalytical Chemistry, 2007, pp. 1049-1057, vol. 388.

Sharma, S.K. et al., "Portable remote Raman system for monitoring hydrocarbon, gas hydrates and explosives in the environment," Spectrochimica Acta Part A, 2005, pp. 2404-2412, vol. 81.

Lewis, P.R. et al., "Recent advancements in the Gas-Phase MicroChemLab," IEEE Sensors Journal, Jun. 2006, pp. 784-794, vol. 6, No. 3.

Chinowsky, T.M. et al., "Portable 24-analyte surface plasmon resonance instruments for rapid, versatile biodetection," Biosensors and Bioelectronics, 2007, pp. 2268-2275, vol. 22.

Bromage, T.G. et al., "The portable confocal microscope: scanning optical microscopy anywhere," Science, Technology and Education of Microscopy: an Overview, 2003, pp. 742-752.

Wein, L.M. et al., "Analyzing a bioterror attack on the food supply: The case of botulinum toxin in milk," PNAS, Jul. 12, 2005, pp. 9984-9989, vol. 102, No. 28.

(Continued)

*Primary Examiner* — J. Christopher Ball
(74) *Attorney, Agent, or Firm* — Olivia J. Tsai

(57) ABSTRACT

Systems and methods for combining dielectrophoresis, magnetic forces, and hydrodynamic forces to manipulate particles in channels formed on top of an electrode substrate are discussed. A magnet placed in contact under the electrode substrate while particles are flowing within the channel above the electrode substrate allows these three forces to be balanced when the system is in operation. An optical detection scheme using near-confocal microscopy for simultaneously detecting two wavelengths of light emitted from the flowing particles is also discussed.

12 Claims, 14 Drawing Sheets

OTHER PUBLICATIONS

Gijs, M.A.M, "Magnetic bead handling on-chip: new opportunities for analytical applications," Microfluid Nanofiuid, Oct. 2, 2004, pp. 22-40, vol. 1.
Pamme, N. et al., "Continuous sorting of magnetic cells via on-chip free-flow magnetophoresis," Lab on a Chip, 2006, pp. 974-980, vol. 6.
Blake. M.R. et al., "Immunomagnetic Detection of *Bacillus stearothermophilus* Spores in Food and Environmental Samples," Applied and Environmental Microbiology, May 1997, pp. 1643-1646, vol. 63, No. 5.
Straub, T.M., "Automated methods for multiplexed pathogen detection," Journal of Microbiological Methods, 2005, pp. 303-316, vol. 62.
Gu, H. et al., "Biofunctional magnetic nanoparticles for protein separation and pathogen detection," Chemical Communications, Jan. 19, 2006, pp. 941-949.
Chandler, D.P. et al., "Automated immunomagnetic separation and microarray detection of *E. coli* O157:H7 from poultry carcass rinse," International Journal of Food Microbiology, 2001, pp. 143-154, vol. 70, No. 1.
Mulvaney, S.P. et al., "Rapid, femtomolar bioassays in complex matrices combining microfluidics and magnetoelectronics," Biosensors and Bioelectronics, 2007, pp. 191-200, vol. 23, No. 2.
Herrmann, M. et al., "Enzymatically-generated fluorescent detection in micro-channels with internal magnetic mixing for the development of parallel microfluidic ELISA," Lab on a Chip, Mar. 3, 2006, pp. 555-560, vol. 6.
Herrmann, M. et al., "Microfluidic ELISA on non-passivated PDMS chip using magnetic bead transfer inside dual networks of channels," Lab on a Chip, Jul. 17, 2007, pp. 1546-1552, vol. 7.
Morgan. H. et al., "3D focusing of nanoparticles in microfluidic channels," IEEE Proceedings Nanobiotechnolagy, Nov. 2003, pp. 76-81, vol. 150, No. 2.
Lin, C. et al., "Vertical Focusing Device Utilizing Dielectrophoretic Force and Its Application on Microflow Cytometer," Journal of Mictoelectromechanical Systems, Dec. 2004. pp. 923-932, vol. 13, No. 6.
Yu, C. et al., "A Three-Dimensional Dielectrophoretic Particle Focusing Channel for Microcytometry Applications," Journal of Microelectromechanical Systems, Jun. 2005, pp. 480-487, vol. 14, No. 3.
Holmes, D. et al., "High throughput particle analysis: Combining dielectrophoretic particle focussing with confocal optical detection," Biosensors and Bioelectronics, 2006, pp. 1621-1630, vol. 21.
Jones, T.B., "Dielectrophoresis and magnetophoresis," Electromechanics of Particles, 1995, pp. 36-37, 65-66.
James, C.D. et al., "Monolithic surface micromachined fluidic devices for dielectrophoretic preconcentration and routing of particles," Journal of Micromechanics and Microengineering, 2006, pp. 1909-1918, vol. 16.
Feili, D. et al., "Encapsulation of organic field effect transistors for flexible biomedical microimplants," Sensors and Actuators A, 2005, pp. 101-109, vol. 120.
McBride, M.T. et al., "Multiplexed Liquid Arrays for Simultaneous Detection of Simulants of Biological Warfare Agents," Analytical Chemisty, Apr. 15, 2003, pp. 1924-1930, vol. 75, No. 8.
Pearman, W.F. et al., "Classification of Chemical and Biological Warfare Agent Simulants by Surface-Enhanced Raman Spectroscopy and Multivariate Statistical Techniques," Applied Spectroscopy, 2006, pp. 356-365, vol. 60, No. 4.
Derzon, M.S. et al., "Timely multithreat biological, chemical and nuclide detection, a platform, a metric, key results," International Journal of Techonology Transfer and Commercialism, 2008, pp. 413-435, vol. 7, No. 4.
Bennett, D.J. et al., "Combined field-induced dielectrophoresis and phase separation for manipulating particles in microfluidics." Applied Physics Letters, 2003, pp. 4866-4868, vol. 83.

* cited by examiner

PORTABLE DUAL FIELD GRADIENT FORCE MULTICHANNEL FLOW CYTOMETER DEVICE WITH A DUAL WAVELENGTH LOW NOISE DETECTION SCHEME

CROSS-REFERENCE TO RELATED APPLICATIONS

This application claims priority to U.S. Provisional Patent Application Ser. No. 61/167,235, filed Apr. 7, 2009, the entire contents of which are incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

TECHNICAL FIELD

Aspects of the disclosure relate to a microfluidic system in which magnetic and electric forces are used in combination to manipulate magnetic particles for high throughput multi-channel optical interrogation. Other aspects of the disclosure relate to a coincident two wavelength detection technique with noise rejection. More specifically, aspects of the disclosure relate to methods and related systems for using magnetic forces (magnetophoresis (MEP)) to pull particles to the surface of a chip where arrays of microelectrodes generate dielectrophoretic (DEP) forces that cause particles to align into single file streams while being slightly repelled above the chip surface. This dual force technique may also be used to fractionate particles based on size. In addition, the two wavelength detection technique employed with this system uses near-confocal microscopy and customized software to simultaneously detect two wavelengths of light emitted through the fluorescence of a target analyte bound to the particles.

BACKGROUND

Miniaturized particle manipulation systems may be used for many flow cytometry detection applications, including sensing radioactive particles, nerve agents, organics and explosives, chemical warfare agents, and biological substances. See J. A. Rust et al., *Spectrochimica Acta B* 61, 225 (2006); F. Arduini et al., *Analytical Bioanalytical Chemistry* 388, 1049 (2007); S. K. Sharma at al., *Spectrochimica Acta Part A* 61, 2404 (2005); P. R. Lewis at al. *IEEE Sensors Journal* 6, 784 (2006); and T. M. Chinowsky et al., *Biosensors and Bioelectronics* 22, 2268 (2007).

In addition, Bromage et al. developed a portable confocal microscope capable of high-resolution microscopy for numerous detection applications. See T. G. Bromage et al., 2003, In A. Mendez-Vilas (Ed.), *Science, technology, and education of microscopy: an overview*. Formatex: Badajoz. pp. 742-752. These field-deployable biodetection systems would also be useful in screening infectious disease and bioterrorism threats in industrial environments such as food and beverage processing facilities. See L. M. Wein and Y. Liu. *PNAS* 102, 9984 (2005). However, many of the current systems suffer from the inability to (1) detect trace quantities of substances, and (2) handle complex raw samples. In this regard, advances in sample preparation technology are crucial for the development of robust detector systems that are field-deployable.

Dielectrophoresis (DEP) has been utilized by numerous labs to focus particles in microfluidic systems; however, these systems typically generate single streams of focused particles similar to commercial sheath-flow flow cytometers. See H. Morgan, at al., *Proceedings of the IEEE Nanobiotechnology* 150 (2) (2003) 76-81; C. Lin, at al., *Journal of Microelectromechanical Systems* 13 (6) (2004) 923-932; C. Yu et al., *Journal of Microelectromechanical Systems* 14 (3) (2005) 480-487; and D. Holmes et al., *Biosensors and Bioelectronics* 21 (8) (2006) 1621-1630. Morgan et al. utilized two closely spaced (10 μm) electrode chips to provide 3D focusing of particles, but it is difficult to generate single-file streams of particles with the device. See H. Morgan, et al., *Proceedings of the IEEE Nanobiotechnology* 150 (2) (2003) 76-81. Holmes et al. generated single-file particle focusing a similar system configuration, but the chip format used in this design still produces only one stream of focused particles. See D. Holmes et al., *Biosensors and Bioelectronics* 21 (8) (2006) 1621-1630.

Meanwhile, magnetic forces have been utilized extensively for their high selectivity and ease of use in sample preparation. See M. A. M. Gijs, *Microfluidics Nanofluidics* 1, 22 (2004). Target analytes can be bound to magnetic particles through designed surface chemistries, enabling highly selective forces to be applied only to these analytes due to the fact that most substances are transparent to magnetic fields. See N. Pamme and C. Wilhelm, *Lab on a Chip* 6, 974 (2006). This is particularly important for handling complex sample matrices containing substances that can interfere with downstream analysis techniques.

Labs are developing immunomagnetic sample preparation methods for detection systems. See M. R. Blake and B. C. Weimer, *Applied and Environmental Microbiology* 63, 1643 (1997); T. M. Straub et al., *Journal of Microbiology Methods* 62 (3) (2005) 303-316; and H. Gu et al., *Chemical Communications* 9 (2006) 941-949. Chandler et al. demonstrated an automated system for detecting bacteria in animal carcasses using PCR and DNA microarrays. See D. P. Chandler et al., *International Journal of Food Microbiology* 70 (1) (2001) 143-154. The system developed by Chandler et al. utilizes an electromagnet and a ferromagnetic porous material for generating large magnetic field gradients to trap magnetic particle chaperones bound to target analytes. Mulvaney et al. utilized a similar scheme, but with a giant magnetoresistance sensor for detection. See S. P. Mulvaney et al., *Biosensors and Bioelectronics* 23 (2) (2007) 191-200.

However, non-optical detection schemes such as surface plasmon resonance and electrochemical detection often suffer from lower sensitivity and higher background noise, while more sensitive techniques such as PCR and microarrays have slower throughput, are susceptible to contamination, and are difficult to scale-down and integrate. See T. M. Chinowsky et al., *Biosensors and Bioelectronics* 22 (9-10) (2007) 2268-2275; and F. Arduini et al., *Analytical Bioanalytical Chemistry* 388, 1049 (2007). Recent work in microfluidic ELISA systems have shown both high sensitivity and rapid processing time; however, the reagents used in these systems require physical isolation prior to the interrogation step, a requirement that significantly increases device complexity. See M. Hermann et al., *Lab on a Chip* 6 (2006) 555-560; and M. Herrmann et al., *Lab on a Chip* 7 (2007) 1546-1552.

BRIEF SUMMARY

The following presents a simplified summary of the disclosure in order to provide a basic understanding of some aspects. It is not intended to identify key or critical elements or to delineate the scope of the invention. The following summary merely presents some concepts of the disclosure in a simplified form as a prelude to the more detailed description provided below.

In an illustrative aspect of the disclosure, a microfluidic particle manipulation system is presented to create a balance of forces between the strong magnetic forces that act over large distances to pull magnetic particles to a microfluidic chip surface and the short range repulsive dielectrophoretic forces that cause particles to line up in single file streams while slightly levitating above the chip surface. This device may allow multiple streams of single file particles to be optically interrogated, improving conventional flow cytometer throughput while eliminating the need for large volumes of liquid for sheath-flow focusing of particles.

in another illustrative embodiment, a microfluidic particle manipulation system is presented to fractionate different sizes of particles for sample preparation applications.

In yet another illustrative embodiment, an optical system with noise rejection that uses a bench-top microscope for simultaneous detection of two optical wavelengths emitted from target analytes bound to particles within the microfluidic chip is presented.

Of course, the systems, devices, and methods of the above-referenced embodiments may also include other additional elements, steps, computer-executable instructions, or computer-readable data structures. In this regard, other illustrative embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
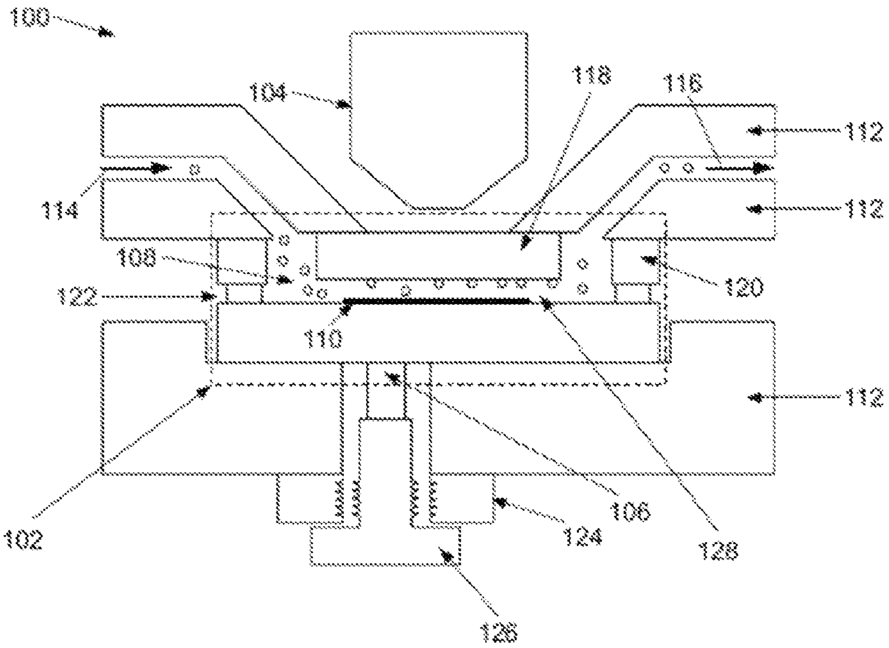
FIG. 1 illustrates a schematic of a particle manipulation system using dielectrophoresis and magnetophoresis in accordance with various aspects of the disclosure.

FIG. 1 is a schematic of an illustrative embodiment of a bench-top detection system 100 that uses high throughput optical interrogation combined with integrated microsystem-based sample preparation technology in accordance with at least one aspect of the present disclosure. System 100 may be comprised of a microfluidic device 102 and an optical detector 104 for interrogating samples within microfluidic device 102. Sample preparation may be performed in the microfluidic device 102 attached to a permanent magnet 106 for pelleting (preconcentration) and washing of fluorescent magnetic particles (FMPs) 108. Other embodiments of microfluidic device 102 may utilize an electromagnet instead of a permanent magnet to achieve similar results as further described below. The small dimensions (~μm's) of channel 128 within device 102 may reduce the effective sample volume and remove contaminants from the sample, thus also reducing detection signal background noise and false positives. In other embodiments, it should be noted that channel 128 may take on a range of dimensions from the nanometer to the millimeter range. Further, device 102 may utilize AC dielectrophoresis (DEP) with interdigitated electrodes 110 for focusing magnetic particles 108 into multiple single-file streams for high-throughput optical analysis of target presence and identity. In addition, the coupling of DEP and magnetophoretic (MEP) forces for particle focusing in the system may provide more efficient and stable single-file particle focusing which reduces signal variability in the detector 104 and simplifies quantitative analysis.

In one illustrative embodiment, microfluidic chips 102 for DEP manipulation of FMPs 108 were fabricated on 4 inch Pyrex wafers to minimize stray capacitance between electrodes 110 at high frequencies (MHz). To create the electrodes 110, standard photolithography was performed on the substrates, followed by evaporation of a 20 nm Ti adhesion layer and a 100 nm layer of gold or platinum. Photoresist was then removed with sonication in acetone and a brief oxygen plasma treatment, leaving the metal microelectrode structures 110. Nonspecific adhesion of particles to the chip surface was largely eliminated by coating chips with Parylene C. See D. Feili et al., *Sensors and Actuators, A, Phys* 120 (1)

(2005) 101-109. To prepare for parylene deposition, chips were treated with an adhesion promoter (1% 3-(trimethoxysilyl) propyl methacrylate in a 25/75 water/isopropanol mixture). Acetic acid was added to the adhesion promoter to adjust the pH to 4-5. After treatment, the chips were rinsed in water, dried, and then coated with ~1 μm of Parylene C (PDS2010, Specialty Coating Systems, Inc., Indianapolis, Ind.). It should be noted that numerous other fabrication techniques may be used to create microfluidic chips 102, including, but not limited to, laser drilling and patterning, molding, and/or sputtering. In addition, other materials, such as silicon and plastics, may be used for the substrate and other materials, such as silver, may be used for the electrodes 110. In fact, even the dimensions and shapes of the various components of detection system 100 may be varied from those of the specific embodiment discussed above.

Meanwhile, fluidic manifold 112 may also be made from a variety of materials, including various polymers, glass, or silicon. In one illustrative embodiment, polyetheretherketone (PEEK), an inert polymer compatible with aqueous and solvent environments, was used to create fluidic manifold 112. The top half of the manifold may contain a fluidic inlet 114 and outlet 116 that may be coupled to a glass observation window 118 through two o-rings 120 to provide liquid-sealed junctions. The observation window 118 may be aliened with a hole in the top of the manifold 112 that allows a microscope objective 104 to interrogate the microfluidic device 102. On the other side of the observation window 118 may lie a laser-cut elastomer gasket 122 that confines the liquid sample between the window 118 and a 20×20 $mm^2$ glass DEP chip 102 (0.5-1.0 mm thick Pyrex). As before, numerous other fabrication schemes, materials, and dimensions may be used to integrate the fluidic manifold 112 with channel structure 128. For instance, anodic or glass-glass thermal bonding may be used to seal window 118 to chip 102 depending on the material choice.

The bottom half of the manifold 112 may contain a through-hole with a fixed nut 124 and screw 126 on the underside of the manifold 112 to attach a magnet 106 to microfluidic device 102. In other embodiments, other attachment schemes such as the use of adhesives, thin film depositions, or clamps, may also be used to attach magnet 106 to device 102. In one embodiment, an NdFeB rod magnet 106 (1/16 inch diameter, United Nuclear Scientific, Sandia Park, N. Mex.) may be fixed to the tip of the screw 126 so that when the screw 126 is tightened, the magnet 106 may move up and interface to the back of the chip 102. This may pull magnetic particles 108 down to the surface of chip 102 due to the strong magnetic field gradient produced by the edges of the permanent magnet 106. See M. A. M. Gijs, *Microfluidics Nanofluidics* 1, 22 (2004); and T. B. Jones, *Electromechanics of Particles*, Cambridge University Press, New York City, N.Y., 1995. p. 36, 65.

As with DEP, the magnetophoretic (MEP) force decays sharply with distance; thus when the screw 126 is loosened, the magnet 106 may move away from the chip 102 and magnetic particle pelleting may cease. One advantage of MEP is that most substances are transparent to magnetic fields, and thus particles may be suspended in any liquid (blood, buffer, milk, etc.) while still achieving high selectivity for capturing only the magnetic particles 108. Manifold 112 may be coupled to capillary fittings (not shown) to inject samples into inlet 114.

Electronic circuits (not shown) may be used to drive the electrodes 110 and provide processing for signals through detector 104. In one illustrative embodiment, the DEP chip 102 is powered by a voltage source through a small printed circuit board on the top of the manifold 112. In this case, the electronic board may interface to the glass chip 102 through spring-loaded gold pogo pins, and may connect directly to a custom-built RF function generator. The function generator may be built on a printed circuit board (2×1 $in^2$) and powered by a 9 volt battery. The board may produce accurate, high-frequency sine waves (up to 20 $V_{p-p}$) with a minimum of external components. Here, the output frequency of the board is controlled over a frequency range of 0.1 Hz to 15 MHz by an internal 2.5V band-gap voltage reference and an external resistor/capacitor combination. Pulse width modulation may be controlled over a wide range by applying a ±2.3 volt control signal. The gain may be set at the current feedback amplifier using a variable resistor. In one embodiment, the amplifier that was chosen has a 145 MHz unity gain bandwidth (3 dB) and a slew rate of 1600V/uS. The duty cycle and frequency controls may be independent and may be selected at the output by setting the appropriate binary code at two transistor-transistor logic (TTL) compatible select pins. The maximum output current in one embodiment may be on the order of 20 mA. It should be noted that numerous other components and schemes may be used to create electronic circuits for system 100. These circuits may be integrated directly with the microfluidic device 102, as discussed in one particular embodiment above, or they may be discrete components that interface with device 102.

Figure 2:
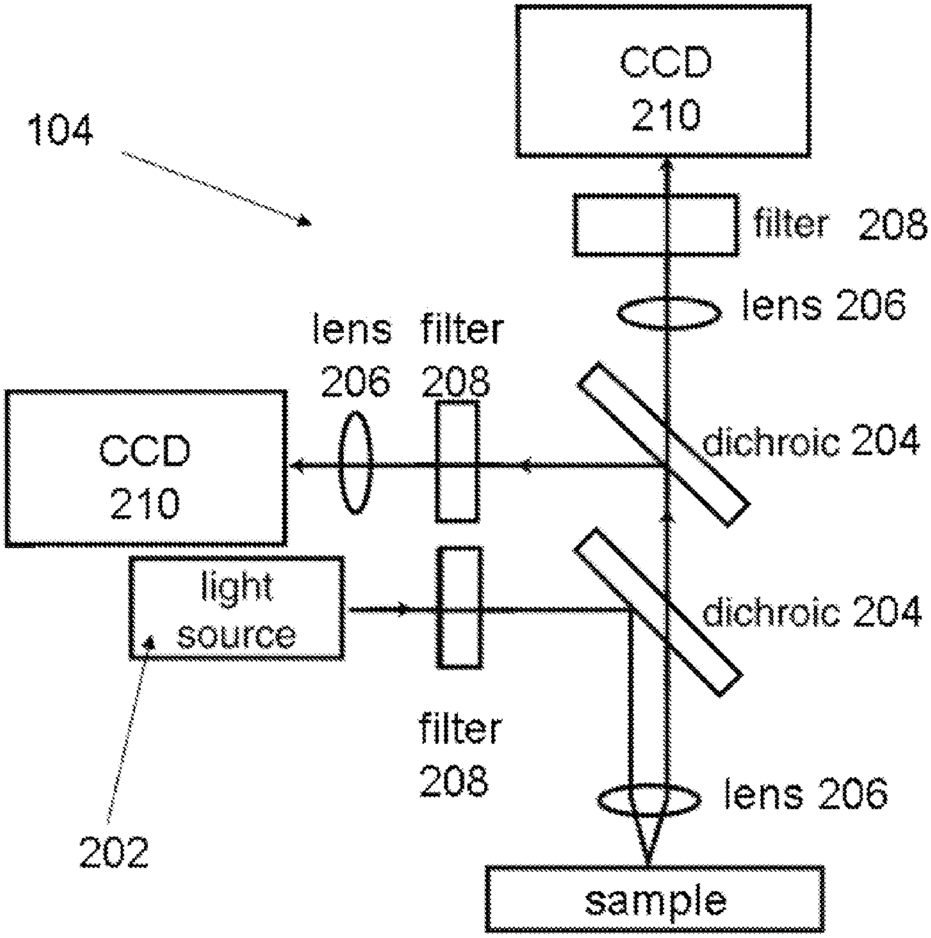
FIG. 2 illustrates a schematic of a bench top optical detector system for low noise simultaneous detection of two wavelengths emitted from a target analyte in accordance with various aspects of the disclosure.

FIG. 2 is a schematic of an illustrative embodiment of a bench top optical detector system 104 for low noise and simultaneous detection of two wavelengths emitted from a target analyte in accordance with at least one aspect of the present disclosure. In one embodiment, optical detector 104 may be a bench-top near-confocal microscope used to interrogate streams of focused particles 108 for the presence of targets 306. The bench-top near-confocal microscope 104 may be capable of detecting two wavelengths simultaneously: a primary wavelength for target-identification and a secondary reporter wavelength that signifies the presence of a target. In one embodiment, the light source 202 of optical detector 104 may be a high-power white-light source that is fiber-optically coupled to the detector 104. Excitation light may be coupled to the system using a dichroic mirror 204 (allowing excitation and collection through the same lens) and a 20-40× high numerical aperture lens. Both the target-presence and the target-identification fluorescence may be captured by the same lens 206, pass through the dichroic 204, and then split into two detectors by a second dichroic mirror 204. Each detector is fronted by the appropriate fluorescent bandpass filter 208 (670-800 nm for Atto-655 dye, and about 633 nm for a reflected signal). To detect multiple targets, a combination notch filter at each of the target-identification wavelengths may be used in place of the reflected signal filter. A cooled CCD detector array 210 may be used for fluorescence emission detection, which allows reduction of dark current and readout noise for high-sensitivity low-noise detection. The detector 104 may be controlled by a laptop (not shown) with custom software for image capture and analysis. It should be noted that other filters, mirrors, lenses, and sources may be used to implement optical detector 104 based on performance metrics and on the type of particles/analytes being investigated. In other embodiments, detector 104 may be replaced by an integrated fiber optic face plate.

Fluorescent Magnetic Particles

Figure 3:
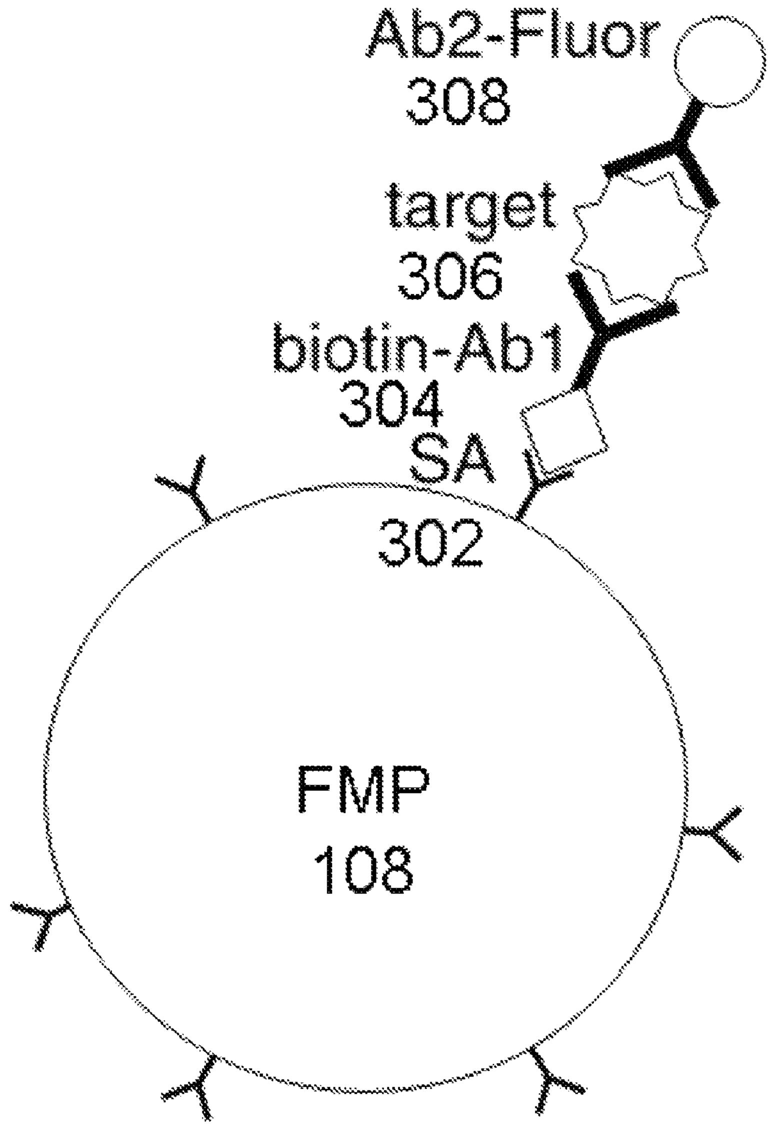
FIG. 3 illustrates a schematic of a fluorescent magnetic particle (FMP) with an associated sandwich assay in accordance with various aspects of the disclosure.

In one illustrative embodiment, system 100 for detecting biological molecules may use a sandwich assay on the surface of FMPs 108. FIG. 3 is a schematic of an illustrative embodiment of an FMP 108 with an associated sandwich assay in accordance with at least one aspect of the present disclosure. Numerous binding chemistries may be used to create the FMP 108 with the proper optochemical properties. In one illustrative embodiment, to create particles 108, carboxylated polystyrene particles (3.0 μm diameter; Spherotech Inc., Lake Forest, Ill.) embedded with UV-light yellow fluorescent dye molecules and magnetic ferrite nanoparticles were covalently conjugated to streptavidin (SA) 302 through standard amide coupling chemistry. The particles 108 were then suspended in 0.016M phosphate buffered saline, pH 7.4 with 0.02% (w/v) sodium azide ($NaN_3$) and refrigerated at approximately 4° C. until use. In one experiment, the functionality of the covalently linked SA 302 as well as the biotin-binding capacity of the particles was measured using biotinylated fluorescein isothiocyanate (biotin-FITC) and the value was determined to be 0.77 nmol per milligram of the microspheres. Based upon this value, the estimated number of biotin-binding sites (BBS) was $2.3\times10^6$ BBS per particle.

With the SA-biotin chemistry discussed above, the internal fluorescence signal may be used for target-identification for particle 108 by indicating which particular biotinylated antibody (biotin-Ab1) 304 may be bound to the particle surface. For multiplexed detection, each set of SA-coated particles with a different internal color may be mixed separately with an appropriate biotinylated-Ab1 304 to ensure correspondence between the internal fluorescence signal and the target antibody 306. With this particular chemistry, the extremely strong association of the SA-biotin interaction ($K_d$=approximately $10^{-15}$ M) may ensure stable anchoring of the biotinylated antibodies 304 to the particle surface.

The antibody functionalized particles may then be resuspended in phosphate-buffered saline, pH 7.4 containing $NaN_3$ and stored at 4° C. until use. Multiple sets of antibody-anchored particles may then be mixed into the sample for multiple target capture. Target analytes 306 may then bind to their corresponding antibody-anchored particles. The sandwich assay may be completed when appropriate secondary antibodies with an attached fluorophore (Ab2-Fluor, in one embodiment) 308 bind to the target analyte 306. As an example of an Ab2-Fluor conjugate, one of the experiments conducted used a long-wavelength fluorophore Atto-655 (Fluka BioChemika; obtained through Sigma-Aldrich, Saint Louis, Mo.) to covalently conjugate a second antibody to chicken ovalbumin using NHS-ester coupling. The Ab2-Flour conjugate 308 target-presence signal may indicate the presence of a target on the surface of the particle. Again, Ab2 may be different for different targets and specific to its own recognition analyte. Thus, several Ab2s may be utilized for multiplexed detection while keeping the fluorophore coupled to Ab2 the same.

Integrated MEP Pelleting of FMPs

As mentioned earlier, one procedure that may be performed in system 100 is the pelleting of the FMPs 108. This step may reduce the sample volume in which FMPs 108 are suspended (for example, from 100 μl to <1 μl). In addition, while the particles 108 may be pelleted at the surface of the DEP chip, contaminants and interferants may be removed from the particles 108 and surrounding medium with a wash step, thus reducing background noise and false positives/negatives.

Figure 4:
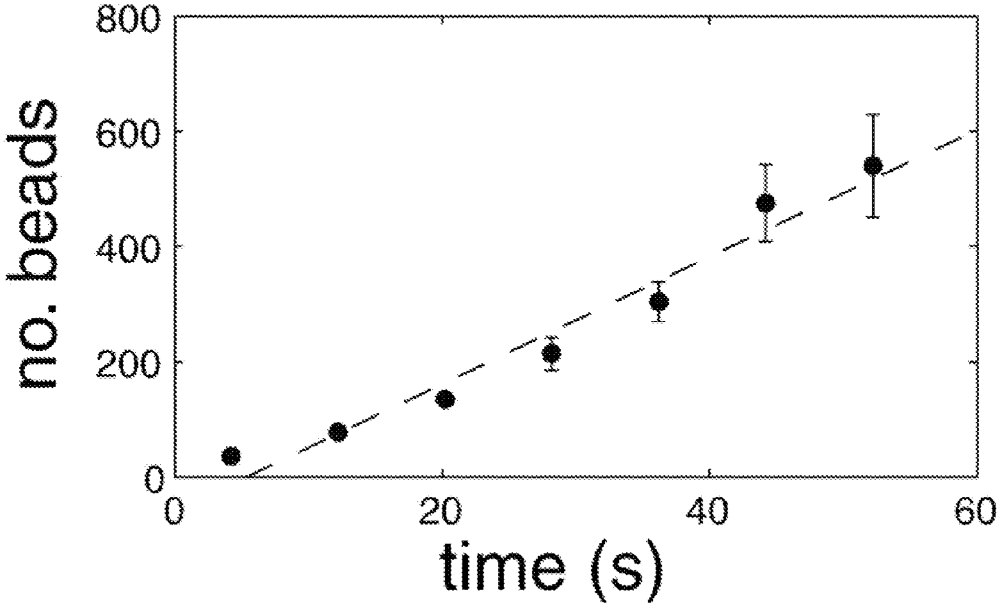
FIG. 4 illustrates a time-dependent FMP preconcentration curve with a linear fit ($y=11.0*x-59.0$, $r^2=0.9646$) for flowrate=20 μL/min in accordance with various aspects of the disclosure.

FIG. 4 shows the results of a pelleting procedure performed in the manifold system 102 in accordance with at least one aspect of the present disclosure. In one particular experiment, magnetic particles (8.5 μm diameter, Bangs Labs, Inc., Fisher, Ind.) 108 were suspended in DI water at a 1% v/v concentration and connected to one of the inlets of the mechanical valve upstream of the manifold 112. Two syringes were coupled to a two-way fluidic valve upstream of the microfluidic system 102—one containing the FMP solution and the other containing DI water for washing the bead pellet. An NdFeB rod magnet 106 was engaged to the bottom of the DEP chip 102, and the particle solution was injected into the system at 20 μl/min. After a sufficient amount of particles 108 have been captured to the chip 102, the valve was switched to DI water to wash the particle pellet. At 20 μl/min, the horizontal MEP force was strong enough to prevent particles 108 from being removed from the preconcentration zone. An average preconcentration profile from three separate experiments is shown in FIG. 4. Within this experiment, approximately 600 particles 108 could be preconcentrated within a minute, with few residual particles 108 remaining on the surface after the magnet 106 was disengaged. Residual particles 108 adhered to the chip 102 were removed by passing an air bubble through the system, followed by an isopropanol wash at 100 μl/min. It should be noted that the protocol discussed above for pelleting of FMPs 108 is mentioned simply for illustrative purposes; numerous other steps and sequences may be employed and/or some of those mentioned may be omitted without departing from the scope of the disclosure. For instance, a particle pellet does not necessarily have to undergo a wash step nor do the hydrodynamic conditions have to resemble those set forth in the above illustrative protocol.

DEP Theory

The DEP force, $F_{DEP}$, on a spherical particle of radius $r_p$ subjected to an electric field E is given by:

$$F_{DEP}=2\pi r_p^3\epsilon_m Re[K(\omega)]\nabla E^2 \quad (1)$$

where $\epsilon_m$ is the permittivity of the suspending medium and K(ω) is the Clausius-Mossotti factor. See T. B. Jones, *Electromechanics of Particles*, Cambridge University Press, New York City, N.Y., 1995. p. 36, 65. The electric field can be AC or DC, and the Clausius-Mossotti factor at frequency ω, is given by:

$$K(\omega)=\frac{\varepsilon_p^*-\varepsilon_m^*}{\varepsilon_p^*+2\varepsilon_m^*} \quad (2)$$

where $\epsilon^*_p$ and $\epsilon^*_m$ are the complex permittivities ($\epsilon^*=\epsilon-j\sigma/\omega$) of the particle and fluid, respectively. Particles with low polarizability (Re{K}<0) such as latex particles undergo negative DEP (nDEP), and are repelled from regions containing large $\nabla E^2$ which are typically near the edges of microelectrodes. See C. D. James, et al., *Journal of Micromechanics and Microengineering* 16 (10) (2006) 1909-1918.

DEP Chip Design

Figure 5A:
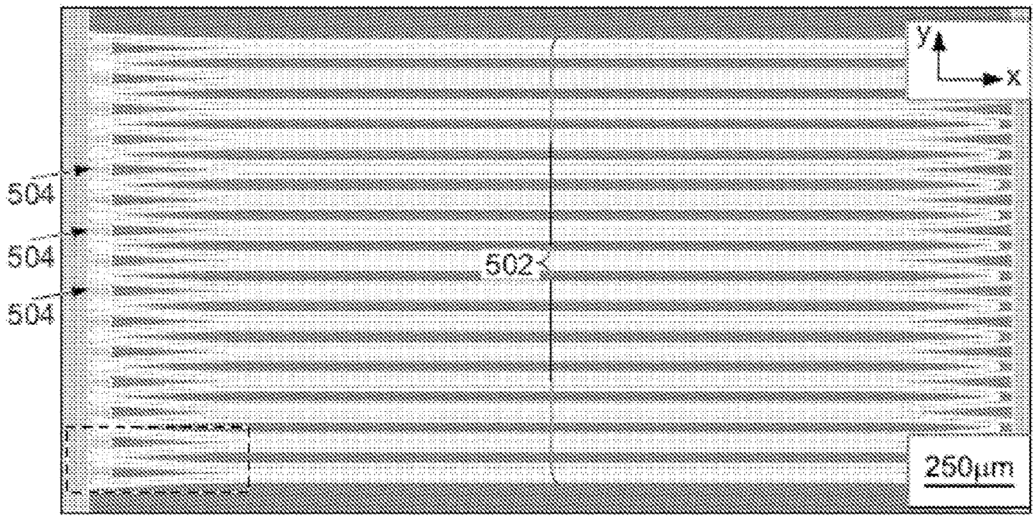
FIG. 5*a* illustrates an interdigitated microelectrode chip for DEP focusing of magnetic particles into single file streams in accordance with various aspects of the disclosure.
Figure 5B:
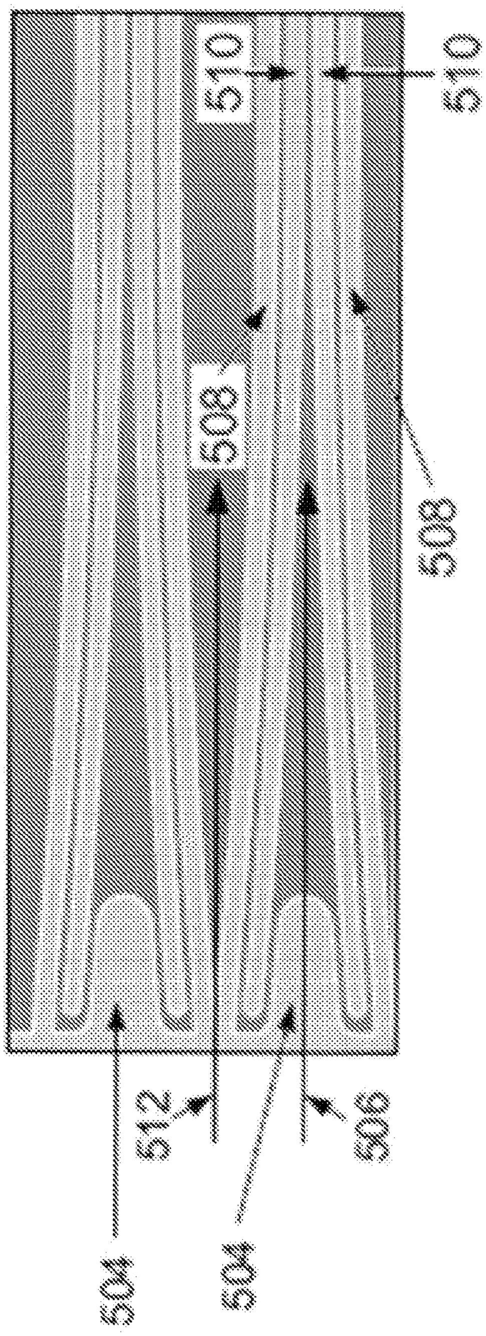
FIG. 5*b* illustrates the boxed region in FIG. 5*a* showing a set of microelectrodes (5 μm electrodes, 5 μm spaces) in accordance with various aspects of the disclosure.

FIGS. 5*a* and 5*b* are an illustrative embodiment of the layout of DEP chip 102 used for focusing FMPs 108 in accordance with at least one aspect of the present disclosure. FIG. 5*b* shows a zoomed-in view of the boxed region in FIG. 5*a*. In these figures, fluid flow may be in the +x direction parallel to the interdigitated microelectrode array 502. Interdigitated electrode array 502 is one specific embodiment of electrodes 110. FMPs 108 may be magnetically pelleted as discussed above to the chip surface just upstream of the microelectrode array region shown in FIG. 5*a*. In other embodiments, FMPs 108 may be pelleted in other locations of chip 102. One side of the interdigitated microelectrode array 502 may contain protrusions 504 (left side of FIG. 5*a*-*b*) that may serve as launching pads for particles into a converging microelectrode gap 506 formed by two microelectrodes 508 on one side of the array converging with two microelectrodes 510 from the other side of the array. This electrode configuration 110 allows for the minimization of sharp electric field gradients where particles 108 enter the interdigitated array 502. The rounded edges of the protrusions 504 minimize the electric field gradients at these edges and allow for a smoother transition of particles 108 into the converging gaps 506. If the launch pads 504 are too narrow relative to the size of the particles 108 being focused, the particles 108 may feel the edge effects of the electric field and thus may be scattered away from the gaps. This configuration using converging and diverging electrode gaps 506 and 512 was also chosen to create a highly focused electric field gradient minimum (see FIG. 5*c*) above the surface of the interdigitated electrode array 502 in the converging gaps 506 so that particles 108 would be tightly focused. In addition, the use of this electrode scheme may allow for slightly less spatially confined electric field gradient minima closer to the surface of interdigitated electrode array 502 in the diverging gaps 512.

Thus, system 100 may be used in one of two different configurations. In one configuration, DEP and MEP are simultaneously employed. Here, a lower flow rate is used to preconcentrate particles upstream of the focusing zone and a higher flow rate is employed to overcome the in-plane MEP forces (x,y) and deliver the particles to the DEP focusing zone of the chip. In such a configuration, the magnetic force encroaches upon the DEP focusing zone such that particles are forced close into proximity of the chip surface under the strong MEP force along the z axis. Minima in the electric field gradient that reside adjacent to the chip surface only occur in the diverging gap regions of the chip. In these regions, particles with a diameter >3 micrometers can fit within the spatial dimensions of these minima, whereas in the converging gaps, the minima close to the chip surface are too small to hold particles larger than 1 micrometer in diameter. This leads to larger particles being pulled down to the diverging gaps under a combination of MEP and DEP forces normal to the chip surface while remaining tightly focused into single file streams under in-plane DEP forces. In a second configuration, MEP is employed sequentially with DEP (i.e., particles 108 are preconcentrated with the MEP force to the floor of the microchannel 128 upstream from the focusing array 502 after which the magnet 106 is switched off and the DEP electrodes 508 and 510 are switched on as the particles 108 flow into the focusing array 502). Here, particles 108 flow both in the converging gaps 506 and diverging gaps 512, thus creating a scenario in which the particles 108 will be focused in the more spatially confined local electric field gradient node in the converging gaps 506 in addition to the broader nodes in the diverging gaps 512. In both experimental configurations, during the focusing procedure, microelectrodes 510 may be held at ground. On either side of the ground microelectrodes 510 may lay the high voltage microelectrodes 508. Microelectrodes 508 may be connected to the same side of the array as the launching pads 504 and form the diverging microelectrode gap 512. In certain embodiments, individual microelectrodes 508 and 510 may be 5 μm wide and the final spacing between converging microelectrodes may be 5 μm. However, in other embodiments, depending on the size of the particles being focused, the width of individual microelectrodes and the spacing between electrodes may range from several nanometers up to several millimeters. In fact, electrode configurations other than the interdigitated arrays 502 shown in FIGS. 5*a* and 5*b* may also be used to create DEP forces. Examples of other electrode configurations 110 include straight line electrodes without converging and diverging gaps and tetrode configurations, among others.

Figure 5C:
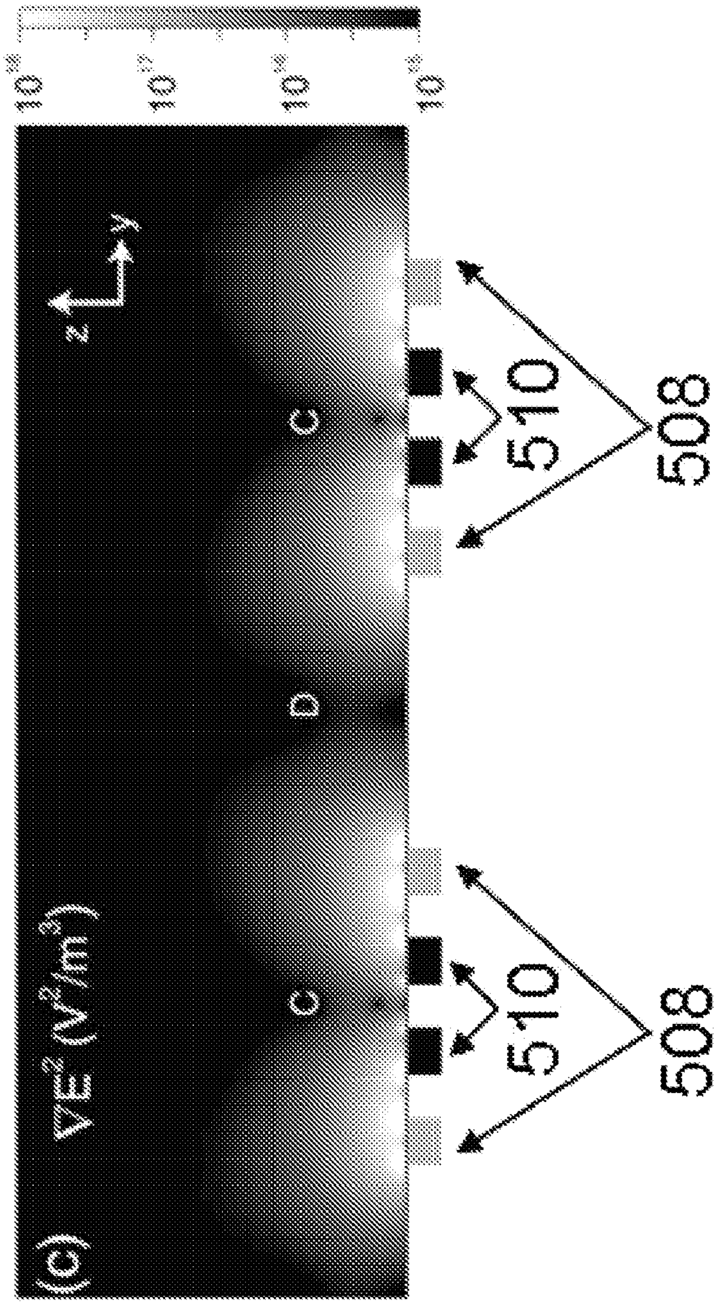
FIG. 5*c* illustrates a simulation of the squared electric field ($\nabla E^2$) generated by the converging and diverging gaps with microelectrodes held at 10 V (gray boxes) and ground (black boxes) in accordance with various aspects of the disclosure.

FIG. 5*c* shows a cross-sectional plot of the $\nabla E^2$ produced by 10V applied between the microelectrodes when individual microelectrodes 508 and 510 are 5 μm wide and the final spacing between converging microelectrodes is 5 μm in accordance with at least one aspect of the present disclosure. Electric field gradients were simulated using commercial code (CFD ACE 2007.2.23) in two dimensions with a triangular mesh density of 0.25 μm. Large gradients ($10^{18}$ $V^2/m^3$) are generated near the microelectrode edges with a steep decrease with distance from the chip surface. If FMPs 108 undergo nDEP when suspended in a DI water wash solution, they may migrate to regions of minimal $\nabla E^2$. The microelectrode configuration shown in FIGS. 5*a* and 5*b* may produce regions of small $\nabla E^2$ (dark regions in FIG. 5*c*) that will confine FMPs 108 to narrow lanes flowing along the x direction. Proper particle focusing may require balancing the nDEP force (+z direction) with gravity (−z direction). If particles are levitated too high above the chip, diminished lateral DEP forces may lead to reduced single file focusing efficiency. As discussed earlier, the converging microelectrode gaps 506 may produce minima in the electric field gradient that are elevated in height and narrower laterally compared to the diverging microelectrode gaps 512, thus resulting in tighter particle focusing. In both of the gaps, the FMPs 108 may be focused into single file columns and levitated to specified heights above the chip surface. This reduces the number of overlapping and out-of-focus (thus undetected) particles 108, thus potentially providing a more accurate sample analysis while reducing noise and minimizing the time needed to perform off-line image analysis. It should be noted that if other electrode configurations are used, electric field minima and maxima may occur in different locations from those described in the illustrative example discussed above.

DEP Particle Focusing

Figure 6A:
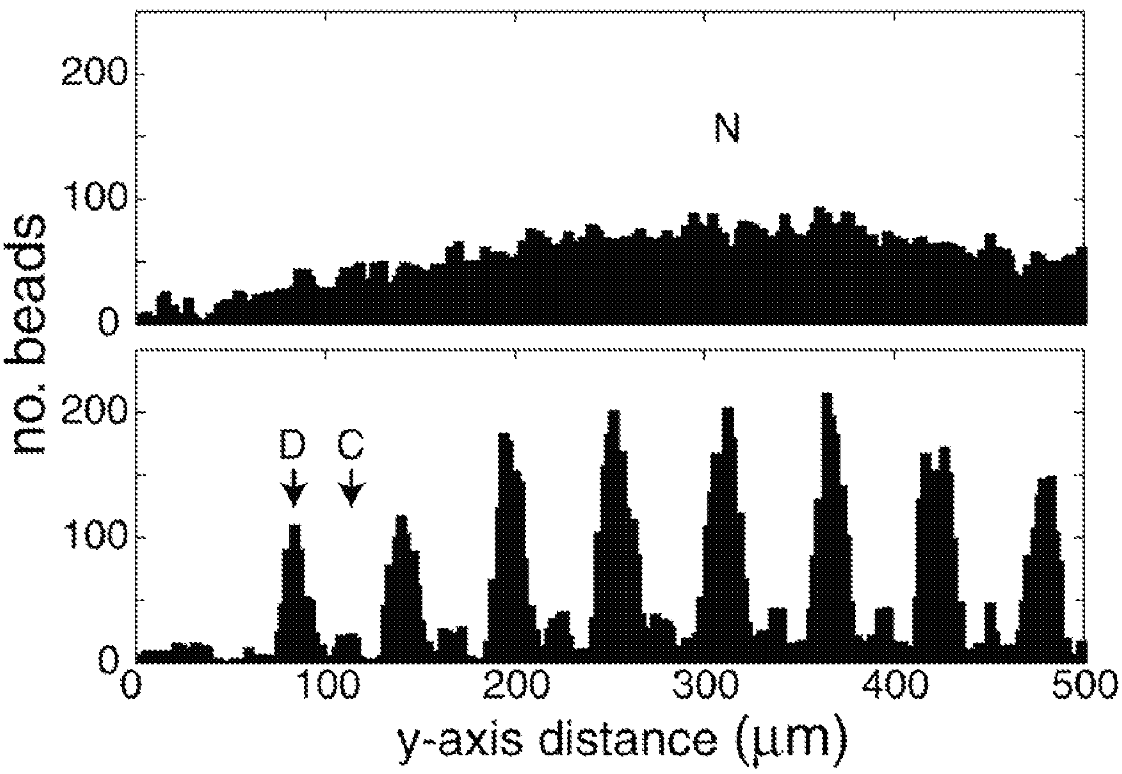
FIG. 6*a* illustrates intensity line-scan signatures of FMPs flowing across the DEP chip before (top, N) and after (bottom) FMP focusing in accordance with various aspects of the disclosure.
Figure 6B:
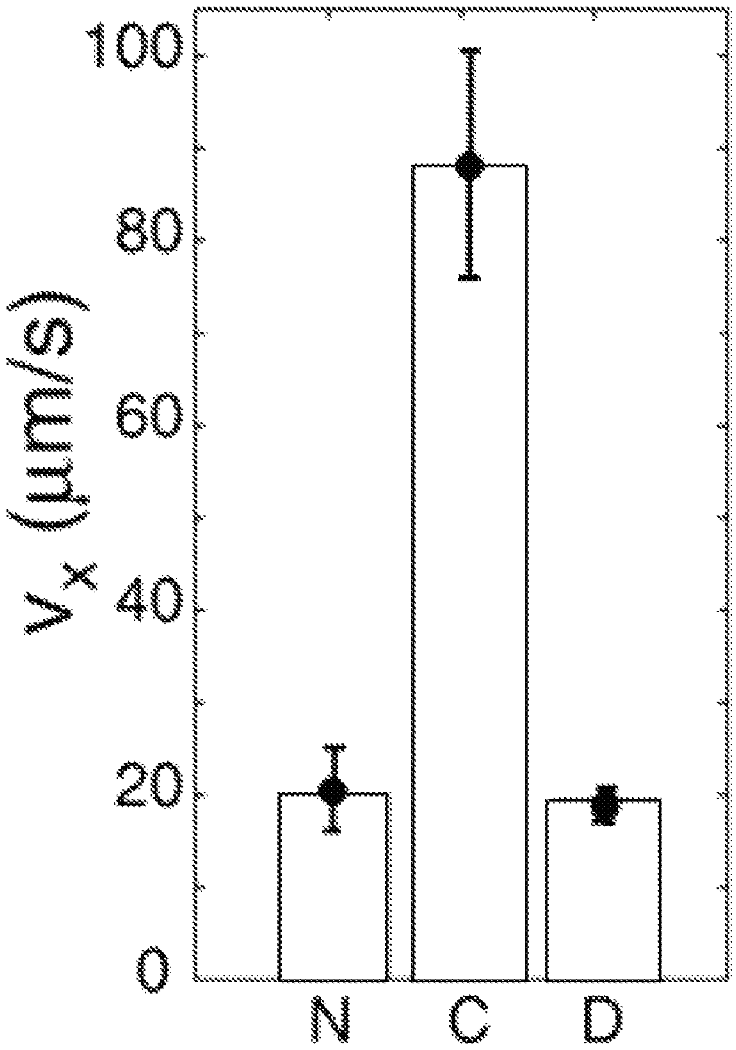
FIG. 6*b* illustrates average x-axis particle velocities (n=7 for each case) in the no-microelectrode (N), converging gap (C), and diverging gap (D) regions of the DEP chip in accordance with various aspects of the disclosure.

FIG. 6 shows the results of DEP focusing of FMPs 108 after being released from magnetic pelleting for the illustrative microfluidic device 102 discussed above in accordance with at least one aspect of the present disclosure. Devices 102 with other physical characteristics run under different operating conditions may produce different DEP focusing results from those shown in FIG. 6. To generate FIGS. 6*a* and 6*b*, FMPs 108 (8.4 μm diameter) were preconcentrated for approximately one minute, and then the magnet 106 was disengaged to release the particles towards the focusing microelectrode array 502 of the chip 102. In this experiment, the DEP chip 102 was coated with approximately 2 μm of Parylene C, and the voltage was set to 20 $V_{p-p}$ at 15 MHz. Parylene aids with biocompatibility of the chip 102. Other materials such as silicon nitride and polydimethylsiloxane may also be used to create a biocompatible surface layer. In yet other embodiments, treatments such as UV light, ethanol/isopropanol rinses, and/or heat may be used to induce biocompatibility of the chip 102. Particle intensities (target identification signal) were monitored as a function of position along the y-axis at two different positions in x: before and after FMPs 108 reached the DEP focusing microelectrodes. In this experiment, the pre-focusing region of the DEP chip 102 is a large 1×1 $mm^2$ electrode pad for connecting either side of the microelectrode array 502 in parallel. This region contains no microelectrode edges; thus the DEP force is much smaller and provides no xy focusing forces. Individual particle signatures were determined with intensity and spatial-length thresholds and calibrated to manual inspection of digital videos. See C. D. James et al., *Journal of Micromechanics and Microengineering* 16 (10) (2006) 1909-1918. In this experiment, the set flow-rate was 20 μl/min and the total time of analysis was 145 seconds. When there are no focusing microelectrodes (shown by the top graph in FIG. 6*a*), the intensity histogram may be a broad peak due to the random position of particles along the y-axis. After particles 108 reach the focusing microelectrodes 502, two sets of peaks develop, corresponding to particles focused in the converging (C) and diverging (D) microelectrode gaps 506 and 512 (shown by the bottom graph in FIG. 6*a*). The converging region peaks correspond to single file particles 108 (~12 μm wide) and are thus narrower in width than the diverging region peaks (~25 μm wide) where between two and three particles 108 can fit along the y-axis in the gap. The center-to-center distance between peaks corresponds to the 65 μm gap between focusing regions. The multi-particle wide focusing in the diverging gaps and the single-particle wide focusing in the converging gaps is directly explained by the widths of the electric field gradient minima shown in these regions in FIG. 5*c*.

As noted earlier, the $\nabla E^2$ profile shown in FIG. 5*b* may lead to higher levitation heights in the converging microelectrode gaps than the diverging microelectrode gaps. In another experiment, particles flowing in the three regions (N—no microelectrodes. D—diverging gap, and C—converging gap) were tracked to monitor particle velocities. The average particle velocity along the x-axis is shown in FIG. 6*b*. The particles have nearly the same velocity in the no microelectrode region and the diverging electrode gap 512 (~20 μm/s), while the particle velocity in the converging electrode gaps 506 was ~4× higher at 90 μm/s. This demonstrates that the converging electrode gaps levitate particles to higher elevations than the diverging electrode gaps, as the flow profiles along the height of the microchannels are parabolic.

Dual-Force FMP Focusing

Figure 7:
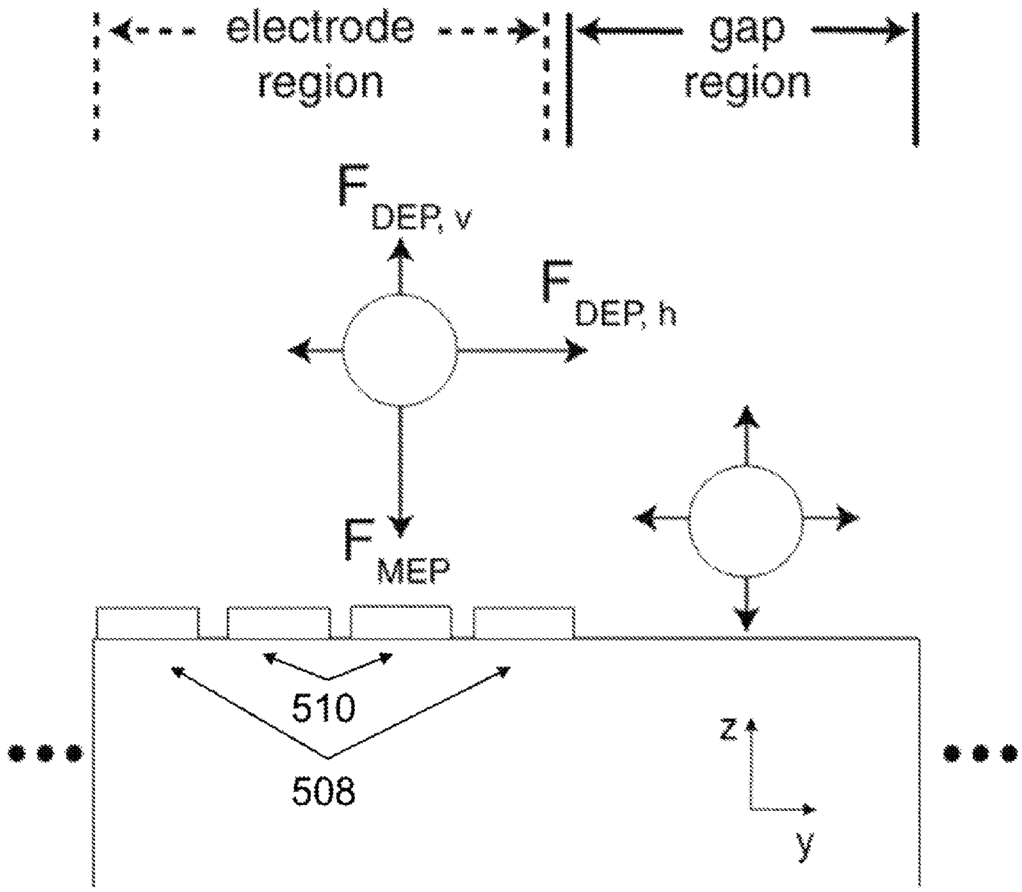
FIG. 7 illustrates a cross-section of an FMP in the vicinity of the chip subjected to both DEP and MEP forces ($F_{DEP}$, $F_{MEP}$) simultaneously in accordance with various aspects of the disclosure. Horizontal (h) and vertical (v) DEP forces are indicated. In regions of the chip with closely spaced microelectrodes, the FMP experiences a collective force driving it to the more energetically-favorable gap regions of the chip.

FIG. 7 shows a schematic of the body forces on an FMP 108 when subjected to both MEP and DEP forces at the same time within the microfluidic system 102 in accordance with at least one aspect of the present disclosure. The figure shows a single set of microelectrodes and a gap region. Here, we assume the MEP force on the FMP 108 is mostly vertical, a reasonable assumption given the large size of the magnet compared to the particle. We also assume that the magnet 106 extends into the region of the chip 102 where the focusing microelectrodes are located. The strong MEP force generated by the magnet 106 beneath the chip 102 will drive FMPs 108 down to the chip surface, similar to the MEP pelleting procedure described previously. If the FMP 108 is above microelectrodes 110 as it approaches the chip 102, the large horizontal DEP forces will cause the FMP 108 to migrate towards regions of the chip 102 where the electric field gradient is a minimum (see FIG. 5*c*). This occurs in the diverging gap regions 512 of the device where there are no microelectrodes. Here, the FMPs 108 settle into minima in the electric field gradient where the MEP and DEP body forces are balanced, and the particles 108 can then migrate under fluid flow in the x direction (see FIG. 7). As discussed earlier, while electric field gradient minima also exist within the converging gaps, the minima are located at a higher z-position relative to the minima produced in the diverging gaps. If MEP forces extend into the focusing region, particles are pushed low enough to the surface of chip 102 such that they migrate primarily to the diverging gap electric field gradient minima. To operate the system using both converging and diverging gap electric field gradient minima, the magnet 106 needs to be turned off after preconcentration and before focusing begins. In this scenario, particles move uniformly to the focusing region and eventually migrate to both the converging and the diverging gap electric field gradient minima. As noted earlier, the converging gaps produced narrower (more tightly focused) streams of particles given the smaller, more tightly confined electric field gradient minimum within this zone.

Figure 8A:
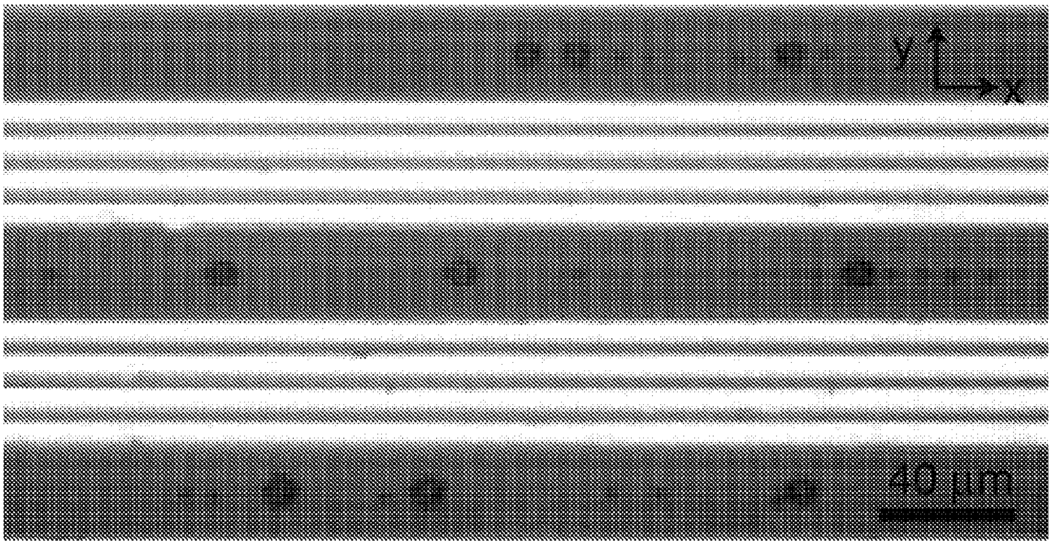
FIG. 8*a* illustrates particle focusing with both DEP and MEP forces acting on 3.0 μm and 8.4 μm diameter magnetic particles in accordance with various aspects of the disclosure.
Figure 8B:
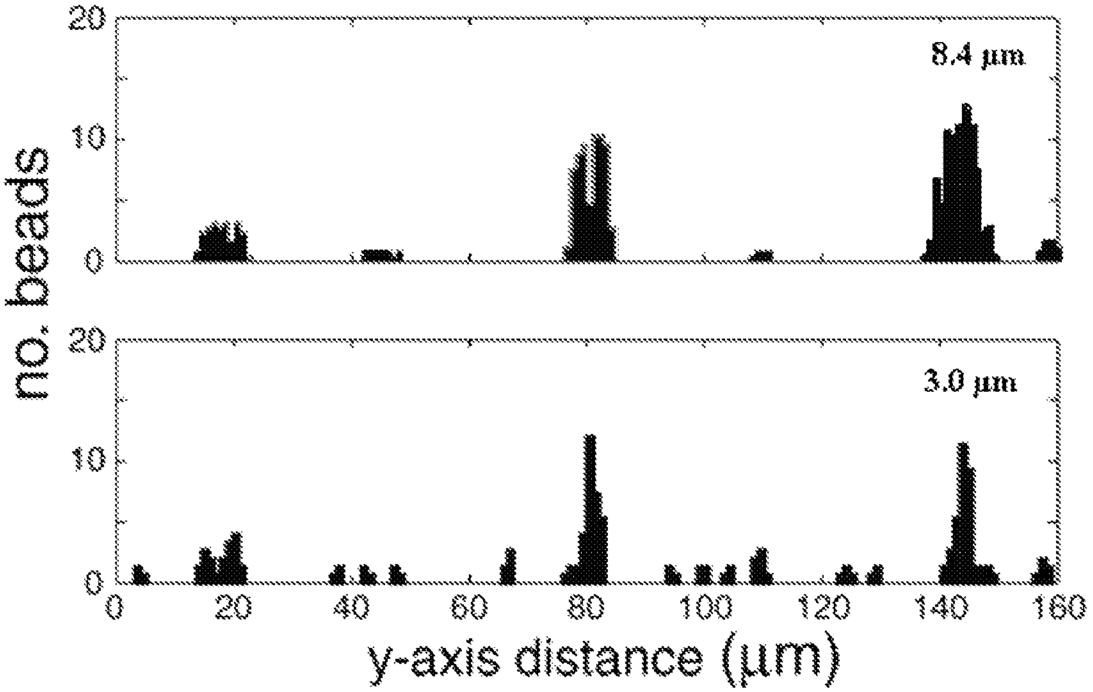
FIG. 8*b* illustrates intensity line-plots of the particle signatures in three diverging electrode gaps in accordance with various aspects of the disclosure.

FIG. 8 is an illustrative embodiment of a schematic in which FMPs 108 are subjected to DEP and MEP forces simultaneously in accordance with at least one aspect of the present disclosure. In this case, the magnet 106 was square (2×2×0.5 $mm^3$) in order to have the magnetic force extend into the microelectrode region of the chip 102. As mentioned earlier, it should be noted that numerous other sizes and shapes of the magnet 106 may be chosen. As expected, the strong MEP force pulled FMPs 108 close to the chip surface into the electrode gap regions where minima in $\nabla E^2$ are close to the surface of the chip 102 (see FIG. 5*c*). The microelectrodes 508 were set to 8 $V_{p-p}$ at 15 MHz. At low flowrates, particles were simply pelleted to the chip surface and were not focused into flowing single file streams of particles. At 100 μl/min. FMPs 108 are pelleted to the chip surface but maintain sufficient x-direction velocity that they focus into flowing single file streams in the microelectrode regions of the chip 102. FIG. 8*a* shows an example of dual MEP and DEP force focusing with a population of 3.0 and 8.4 μm particles 108. This figure shows three streams of particles focused by three separate diverging gaps 512. The picture depicts the particles downstream of the launch and converging electrode region; hence the electrodes all appear linear. The use of other types and sizes of particles 108 may result in different focusing profiles from those shown in FIG. 8*a*.

FIG. 8*h* shows intensity signatures for both 3.0 and 8.4 μm magnetic particles 108 discussed above for FIG. 8*a*. Low intensity signals outside the electrode gap regions are due to out of focus particles flowing through the system at a high elevation above the chip surface. This may be eliminated with low flow-rate delivery and pelleting of particles 108 to the chip surface, followed by higher velocity release and flow focusing with both DEP and MEP forces. For this experiment, the average velocity of the 8.5 μm particles 108 was 56.6±3.3 μm/s, and for 3.0 μm particles 108, the velocity was 28.3±1.4 μm/s (n=7) under a sample delivery flowrate of 100 μl/min. The velocity difference may be due to the larger DEP force (see Equation 1, FDEP∝ particle volume) experienced by the larger particle 108 that causes it to balance vertical forces at a higher elevation above the chip surface. During the flow focusing, the higher velocity 8.5 μm particles 108 overtake the smaller particles, and the displaced 3.0 μm particles 108 are immediately refocused back into single file streams after passage of the larger particles. In this mode, time-of-flight size-based sorting and fractionation may also be performed with device 102. In other embodiments, the particles 108 may be chosen to have different magnetizing properties to focus different size particles 108 at the same elevation. Alternatively, in yet other embodiments, the chip 102 may employ positive dielectrophoresis (pDEP) to fractionate certain particles from mixtures of conductive and nonconductive particles. Particles from the mixture that would undergo pDEP (e.g., cells, bacteria) would be attracted to and adhere to the electrodes and those undergoing nDEP (dirt, dust, soot, etc) would remain levitated and flowed away from the electrodes.

This type of fractionation is described using three dimensional electrode schemes in C. D. James, et al., *Journal of Micromechanics and Microengineering* 16 (10) (2006) 1909-1918, the entire contents of which are herein incorporated by reference. A two dimensional scheme such as that presented here may also be used to sequentially focus and fractionate particles based on factors such as size and/or polarizability. In this configuration, the particles 108 may be focused and filtered using nDEP as before so that the remaining particles may be eluted after being released from a pDEP force as described in Bennett, et al., *Applied Physics Letters* 83 (2003) 4866-4868.

Ovalbumin Detection with the FMP Sandwich Assay

In an illustrative embodiment, detection limits for the FMP-based sandwich assay were measured using chicken ovalbumin, a commonly used botulinum toxin stimulant. See M. T. McBride et al., *Anal. Chem.* 75, 1924 (2003); and W. F. Pearman and A. W. Fountain III, *Applied Spectroscopy* 60, 356 (2006).

In this experiment, biotinylated polyclonal anti-ovalbumin antibodies were stably anchored to the FMP surface via biotin-SA binding interactions as described previously. Rabbit anti-chicken ovalbumin polyclonal antibodies (US Biological, Swampscott, Mass.) were covalently conjugated to a longer wavelength dye (Atto-655, Sigma Aldrich, St. Louis Mo.) using NHS-ester coupling chemistry. Reaction volumes were adjusted to 250 μL using phosphate-buffered saline (PBS), containing 0.05% (v/v) Tween-20 and 10 mg/mL BSA, such that the raw milk constituted 50% (v/v) Vt. All reactions were incubated with gentle shaking for 45 to 60 minutes at ~25° C.

Figure 9A:
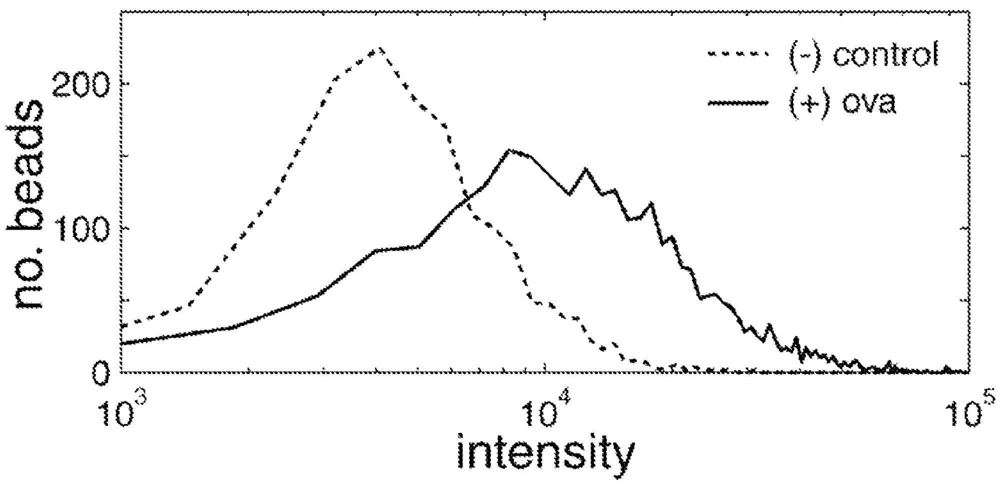
FIG. 9*a* illustrates frequency histograms for a particle-based immunoassay for detecting ovalbumin in accordance with various aspects of the disclosure.
Figure 9B:
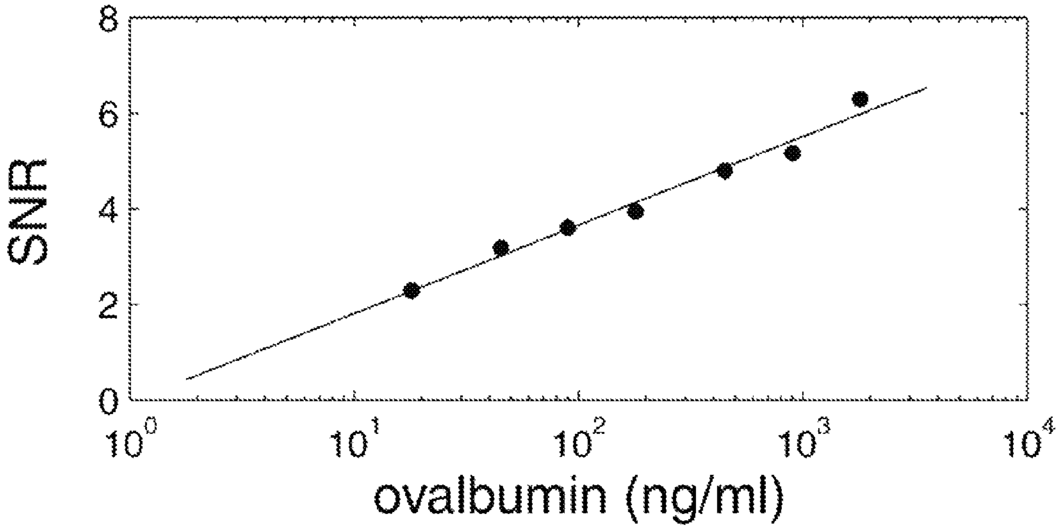
FIG. 9*b* illustrates signal-to-noise ratios as a function of spiked ovalbumin concentration with a log fit ($y=1.849 \log_{10}x+4.132$, $r^2=0.9782$) in accordance with various aspects of the disclosure.

Initial experiments were performed on microscope slides with immobilized FMPs 108 to assess the sandwich assay. Particles were mixed in centrifuge tubes with varying amounts of chicken ovalbumin, followed by pelleting using a permanent magnet 106, washing with PBS-Tween-BSA buffer, and resuspension in PBS. Particles were then further processed by mixing with 5 pmol of rabbit-anti-chicken ovalbumin-(polyclonal)-Atto-655 antibody conjugate dissolved in PBS-Tween-BSA for 45 to 60 minutes at ~25° C., pelleted, and then washed to remove free fluor-conjugated antibody. Particle solutions were then placed on a microscope slide, allowed to settle, and then analyzed with the bench-top optical system. FIG. 9*a* shows a significant shift in the frequency histograms for the negative control and spiked ovalbumin cases for three separate experiments. FIG. 9*b* shows a linear correlation ($r^2$=~0.98) for the concentration vs signal-to-noise ratio curve. From the data in FIG. 8*b*, we calculated a limit of detection of 0.1 pmol (50 ppb) of ovalbumin or approximately 20 ppb when the test was conducted using a raw milk milieu.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. An apparatus comprising:

a plurality of electrodes on a substrate wherein a voltage applied to the electrodes imparts a dielectrophoretic force on magnetic particles located above the substrate and wherein the voltage is tunable to focus the magnetic particles into multiple single file streams, the electrodes include a bi-pronged interdigitated electrode array with converging and diverging electrode gaps; and a magnet proximate to the substrate wherein a magnetic force imparted by the magnet on the magnetic particles located above the substrate, applied simultaneously with the dielectrophoretic force, levitates the magnetic particles at a height above the substrate.

2. The apparatus of claim 1, wherein a spacing between each electrode and a width of each electrode is between several nanometers and several millimeters.

3. The apparatus of claim 1, further comprising a fluidic channel on top of the electrodes for flowing the magnetic particles over the substrate, wherein a balance of forces from the dielectrophoretic force, magnetic force, and a hydrodynamic force allows the magnetic particles to be fractionated based on size.

4. The apparatus of claim 3, wherein walls of the fluidic channel are coated with parylene so that the channel is biocompatible.

5. The apparatus of claim 3, further comprising a syringe pump for flowing the magnetic particles into the channel.

6. The apparatus of claim 1, wherein the magnet comprises an electromagnet such that the electrodes and the electromagnet are both tunable to achieve the dielectrophoretic and magnetic force.

7. The apparatus of claim 1, wherein the bi-pronged interdigitated electrode array further comprises electrode protrusions for launching the magnetic particles into the converging electrode gaps.

8. The apparatus of claim 7, wherein the electrode protrusions are patterned to have rounded edges to minimize an electric field gradient as the magnetic particles enter the converging electrode gaps.

9. The apparatus of claim 1, wherein the magnetic particles comprise fluorescent magnetic particles.

10. The apparatus of claim 9, further comprising integrated optical components for exciting and detecting the fluorescent magnetic particles.

11. The apparatus of claim 1, further comprising integrated circuitry for driving at least one of the following: the electrodes and the magnet.

12. The apparatus of claim 1, wherein the magnet comprises a permanent magnet.

* * * * *